United States Patent
Trzmiel et al.

(10) Patent No.: US 6,474,749 B2
(45) Date of Patent: Nov. 5, 2002

(54) HYDRAULIC SYSTEM FOR ACTUATING AT LEAST TWO OPERATING SYSTEMS OF A MOTOR VEHICLE

(75) Inventors: Alfred Trzmiel, Grafenberg (DE); Wolfgang Stephan, Boll (DE); Roland Meyer, Roth (DE); Andreas Wild, Unterensingen (DE)

(73) Assignee: Hydraulik-Ring GmbH, Nürtingen (DE)

( * ) Notice: Subject to any disclaimer, the term of this patent is extended or adjusted under 35 U.S.C. 154(b) by 0 days.

(21) Appl. No.: 09/874,871

(22) Filed: Jun. 4, 2001

(65) Prior Publication Data

US 2001/0048245 A1 Dec. 6, 2001

(30) Foreign Application Priority Data

Jun. 3, 2000 (DE) .......................... 100 27 734

(51) Int. Cl.$^7$ ................................. B60T 8/34
(52) U.S. Cl. ................. 303/113.3; 303/116.1; 137/118.01; 137/487.5; 60/422
(58) Field of Search ............... 303/119.1, 113.3, 303/113.4, 113.1, 114.1, 114.3, 115.1, 115.2, 116.1, 116.2, DIG. 1, DIG. 10; 137/118.01, 118.02, 487.5, 488; 60/413, 422

(56) References Cited

U.S. PATENT DOCUMENTS

| | | | | |
|---|---|---|---|---|
| 3,579,987 A | * | 5/1971 | Busse | 60/52 |
| 3,785,393 A | * | 1/1974 | Tanguy | 137/110 |
| 3,963,039 A | * | 6/1976 | Coeurderoy | 137/118 |
| 5,653,514 A | * | 8/1997 | Castel et al. | 303/113.3 |
| 5,836,347 A | * | 11/1998 | Harries | 137/487.5 |
| 5,938,297 A | * | 8/1999 | Whaite et al. | 303/114.3 |
| 6,223,763 B1 | * | 5/2001 | Meyer et al. | 137/118.01 |

* cited by examiner

Primary Examiner—Pam Rodriguez
(74) Attorney, Agent, or Firm—Gudrun E. Huckett

(57) ABSTRACT

A hydraulic system for actuating at least two operating systems of a motor vehicle has a first hydraulic medium reservoir for storing a hydraulic medium. A distribution valve is connected to the first hydraulic medium reservoir and to the operating systems of the motor vehicle. A control unit is connected to the distribution valve which is configured to distribute the hydraulic medium from the first hydraulic medium reservoir to the operating systems of the motor vehicle and to control flow of the hydraulic medium to the operating systems of the motor vehicle such that one of the operating systems has priority with regard to supply of the hydraulic medium. A first one of the operating systems is a brake device having a brake power assist unit, a brake valve, and a master brake cylinder. The brake power assist unit is connected via the brake valve to the control unit.

12 Claims, 6 Drawing Sheets

HYDRAULIC SYSTEM FOR ACTUATING AT LEAST TWO OPERATING SYSTEMS OF A MOTOR VEHICLE

BACKGROUND OF THE INVENTION

1. Field of the Invention

The invention relates to a hydraulic system for actuating at least two operating systems of a vehicle, preferably for steering and gear shifting of a motor vehicle. The hydraulic system comprises at least one reservoir for the hydraulic medium from which the hydraulic medium can be supplied via a distribution valve to the two operating systems, wherein the distribution valve is connected to a control unit and controls a flow of the hydraulic medium to the two operating systems such that one operating system has priority over the other operating system.

2. Description of the Related Art

It is known to provide vehicles with a hydraulic system for operating the steering system and the semi-automatic mechanical transmission, wherein the hydraulic system can actuate the valves correlated with the two operating systems. A distribution valve ensures that the two operating systems are supplied with a sufficient amount of hydraulic medium.

SUMMARY OF THE INVENTION

It is an object of the present invention to configure a hydraulic system of the aforementioned kind such that it can be employed in an optimal way in a motor vehicle.

In accordance with the present invention, this is achieved in that a brake device of the vehicle is connected to the control unit which brake device comprises a brake power assist unit and a master brake cylinder, wherein the brake power assist unit is connected via a brake valve to the control unit.

In the hydraulic system according to the invention the brake device of the vehicle is connected to the control unit. By doing so, the brake device can be directly actuated by the control unit, for example, via a ranging device of the vehicle. When the distance to the vehicle ahead is too small, the control unit automatically intervenes and actuates the brake device even when the driver of the vehicle has not yet actuated the brake pedal.

DESCRIPTION OF THE PREFERRED EMBODIMENTS

The hydraulic system according to FIGS. 1 through 6 actuates three operating systems of a motor vehicle. In the illustrated embodiments, the hydraulic system is used for actuating the steering device, the brake system, and the mechanical transmission which can be an electric-hydraulic or electronic-hydraulic transmission inclusive of the clutch actuation. The hydraulic system can also be used, for example, for actuating the sun roof or the like of a motor vehicle.

Figure 1:
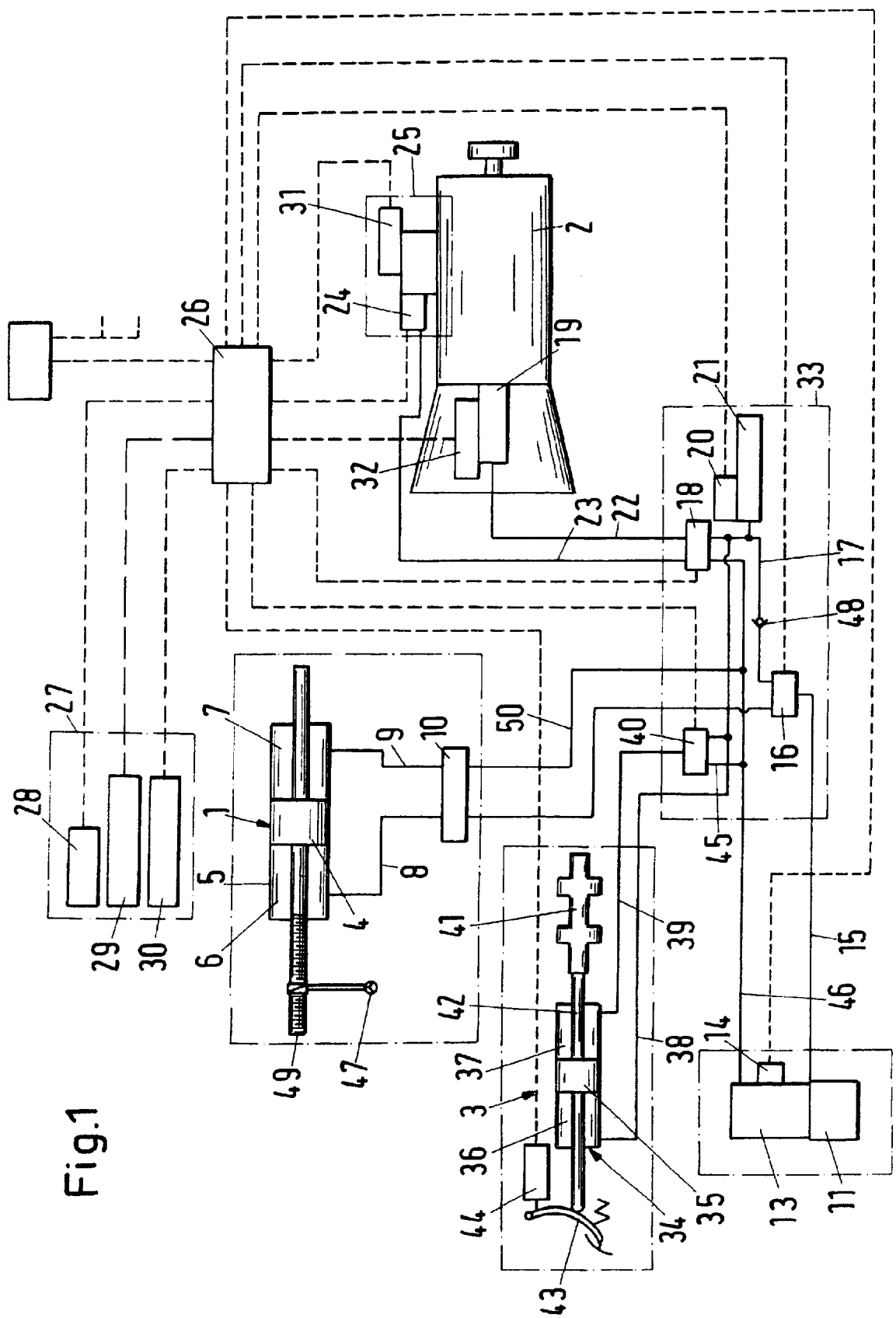
FIG. 1 is a schematic illustration of the hydraulic system according to the invention.

FIG. 1 shows the hydraulic system with which a steering device 1, a transmission 2, and a brake device 3 can be actuated. The steering device 1 has a piston 4 that can be loaded on both ends. The piston 4 is slidably arranged in a cylinder 5. The piston 4 separates two cylinder chambers 6 and 7 from one another. A line 8, 9, respectively, opens into the cylinder chambers 6, 7 via which lines the hydraulic medium can be supplied. The supply of hydraulic medium into the cylinder chambers 6, 7 is controlled by a 4/3 directional control valve 10.

The hydraulic medium is conveyed by means of a motor 11 and a pump 12 (FIG. 3) out of the tank or reservoir 13. The reservoir 13 is advantageously provided with a filling level sensor 14 which monitors the filling level of the reservoir 13. The hydraulic medium is supplied via a pressure line 15 to the distribution valve 16. The hydraulic line 8 connected to the steering device 1 is also connected to the distribution valve 16. A further hydraulic line 17 is guided from the distribution valve 16 via a clutch valve 18 to a clutch 19 which is correlated with the transmission 2. The distribution valve 16 ensures that the steering device 1, the clutch 19, and the transmission 2 can be supplied simultaneously with hydraulic oil. The distribution valve 16 in this connection is embodied such that the supply of the hydraulic medium to the steering device 1 always has priority. This ensures that in any situation the vehicle can still be steered.

A pressure sensor 20 and a reservoir 21 are correlated with the clutch valve 18. A line 22 connects the clutch valve 18 with the clutch 19. Moreover, the clutch valve 18 is connected by a line 23 with a valve block 24 of a gear selector 25 with which, in a manner known in the art, the gutters of the transmission can be selected and the gears corresponding to the selected gutter can be shifted. Accordingly, this is a semi-automatic mechanical transmission where the driver of the motor vehicle selects the desired gears by means of a corresponding shifting lever or by means of keys. The gear selector 25, the clutch 19, and the clutch valve 18 are connected to a control unit 26 with which the functions of these components are monitored and controlled. The control unit 26 can be actuated from the driver compartment 27. As is illustrated in an exemplary fashion in FIG. 1, a display 28, a driving switch 29, and a parking lock 30 can be connected in the driver compartment 27 to the control unit 26. Travel sensors 31, 32 are correlated with the transmission 2 and the clutch 19 and are connected to the control unit 26. The travel sensors 31, 32 monitor the travel of pistons which may be a part of the gear selector 25 and the clutch 19. The gear selector 25 has cylinders for gutter selection and for the gear shifting movement. Each cylinder of the gear selector 25 has also correlated therewith a travel sensor 31, respectively, which operates advantageously in a contactless manner. In the same way, the travel sensor 32 of the clutch 19 also advantageously operates contactless. The clutch valve 18 is provided with a protective function against potential or voltage drop.

The distribution valve 16, the clutch valve 18, the pressure sensor 20, and the reservoir 21 are components of a valve block 33 which is used for the hydraulic oil distribution.

When the hydraulic system is switched on, the filling of the reservoir 21 is monitored by the control unit 26. When the reservoir 21 is filled, the clutch valve 18 receives a signal for opening from the control unit 26. When the reservoir 21 of the clutch valve 18 has a sufficient amount of hydraulic oil, the distribution valve 16 is switched back by means of the control unit 26. As soon as the clutch has opened, it is possible to start the internal combustion engine of the vehicle by means of the control unit 26.

The hydraulic system comprises the brake device 3 which has a brake power assist unit 34 with a cylinder in which a piston 35 is slidably arranged. It separates two pressure chambers 36, 37 in the brake power assist unit 34. A line 38, 39 opens into the pressure chambers 36, 37, respectively. The line 38 opening into the pressure chamber 36 is connected to the brake valve 40 as well as to a line 17 extending to the clutch valve 18. The line 39 opening into the pressure chamber 37 is connected to the brake valve 40. In turn, the brake valve 40 is connected to the control unit 26.

Downstream of the brake power assist unit 34, a master brake cylinder 41 is arranged which is actuated in a manner known in the art by a piston rod 42 projecting from the brake power assist unit 34. It is moved by means of a brake pedal 43 which is provided within the motor vehicle and is pivotable against the force of a spring. The pivot travel of the brake pedal 43 is detected by a sensor 44 which is connected to the control unit 26.

The brake valve 40 is connected by a line 45 with a reservoir line 46 which connects the reservoir 13 with the clutch valve 18. The brake valve 40 is provided within the valve block 33.

The distribution valve 16 is comprised advantageously of a flow control valve (not illustrated) and a switching solenoid valve (not illustrated).

When the steering wheel 47 of the motor vehicle is not turned, the piston 4 of the steering device 1 is in the center position illustrated in FIG. 1. The directional valve 10 arranged upstream is also switched to be in its center position so that the hydraulic medium (oil) is circulating without pressure. The distribution valve 16 ensures that the greater portion of the hydraulic oil reaches the steering device 1 while a smaller portion of the hydraulic oil reaches the clutch valve 18 via the line 17 in which a check valve 48 opening in the direction toward the clutch valve 18 is arranged. As an example, the distribution valve 16 is configured such that 80% of the hydraulic oil will reach the steering device 1 while 20% will flow to the clutch valve 18. Via the line 22, the clutch valve 18 is connected with the clutch 19. Via the line 23 the gear selector 25 used for selecting the desired gutter of the transmission 2 and for shifting the corresponding gear is connected to the clutch valve 18. The configuration of the gear selector 25 is known and is therefore not explained in more detail in this context.

When the steering wheel 47 is turned, pressure is built up in the cylinder 5 of the steering device 1. When, for example, the steering wheel 47 is rotated to the right in the illustration according to FIG. 1, the piston 4 is moved to the right by means of a steering spindle 49. The directional valve 10 is switched such that the hydraulic medium can flow from the reservoir 13 via the line 8 into the pressure chamber 6 of the steering cylinder 5. The hydraulic medium in the other pressure chamber 7 flows via the line 9, the directional valve 10, the reservoir line 15 connected thereto, and the reservoir line 46 back to the reservoir 13.

When the steering wheel is turned in the opposite direction, the movement, flow and switching conditions are reversed.

As soon as the steering wheel 47 is no longer turned, the distribution valve 16 again divides the hydraulic oil supply such that a greater portion of the hydraulic medium again reaches the steering device 1 and a smaller portion reaches the clutch valve 18.

The brake device 3 functions as a hydraulic brake power assist. The brake unit 3 is characterized by being very sensitive as a result of the differential piston 35. When a pressure relief occurs, a very quick reaction of the brake device 3 results. The hydraulic oil supply of the brake device 3 is realized via a pressure reservoir 51 (FIG. 3) in which a preset minimum pressure of, for example, approximately 42 up to approximately 55 bar is present. For normal brake operation it is determined by means of the sensor 44 when the brake pedal 43 is actuated. Since the sensor 44 is connected to the control unit 26, the control unit 26 sends corresponding signals to the brake valve 40 so that it is switched such that the pressure chamber 37 is relieved in the direction toward the reservoir 13. When suppressing the brake pedal 43, the master brake cylinder 41 is actuated via the piston rod 42 and the braking action is carried out. This will be explained in more detail with the aid of FIGS. 3 and 4.

Figure 2:
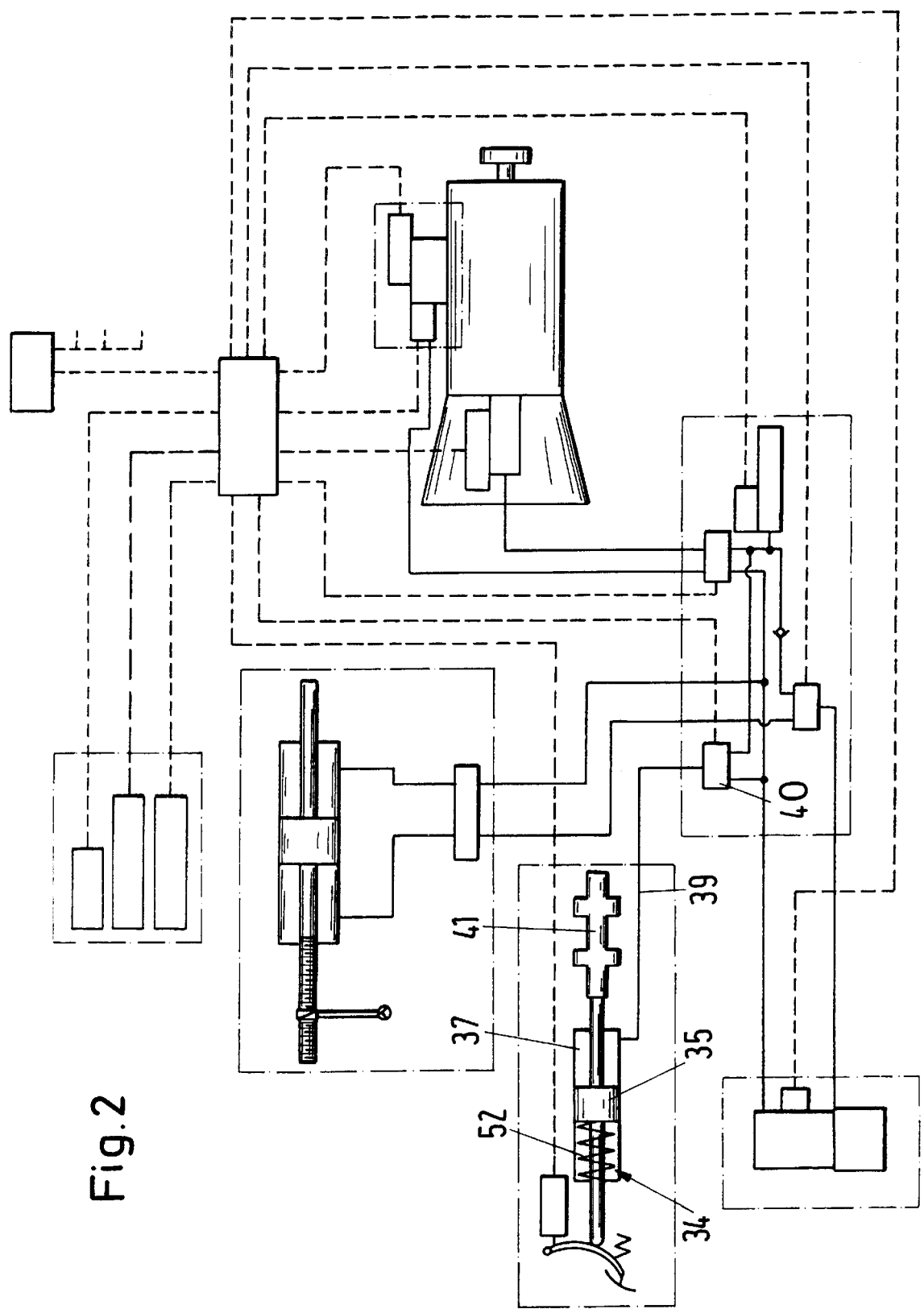
FIG. 2 shows in a representation corresponding to FIG. 1 a second embodiment of a hydraulic system according to the invention.

The hydraulic system according to FIG. 2 differs from the previous embodiment only in that the piston 35 is loaded in the direction toward the master brake cylinder 41 by means of at least one pressure spring 52. Accordingly, only the pressure chamber 37 of the brake power assist unit 34 is connected via the line 39 to the brake valve 40. In regard to other aspects, this hydraulic system is identical to the embodiment according to FIG. 1.

Figure 3:
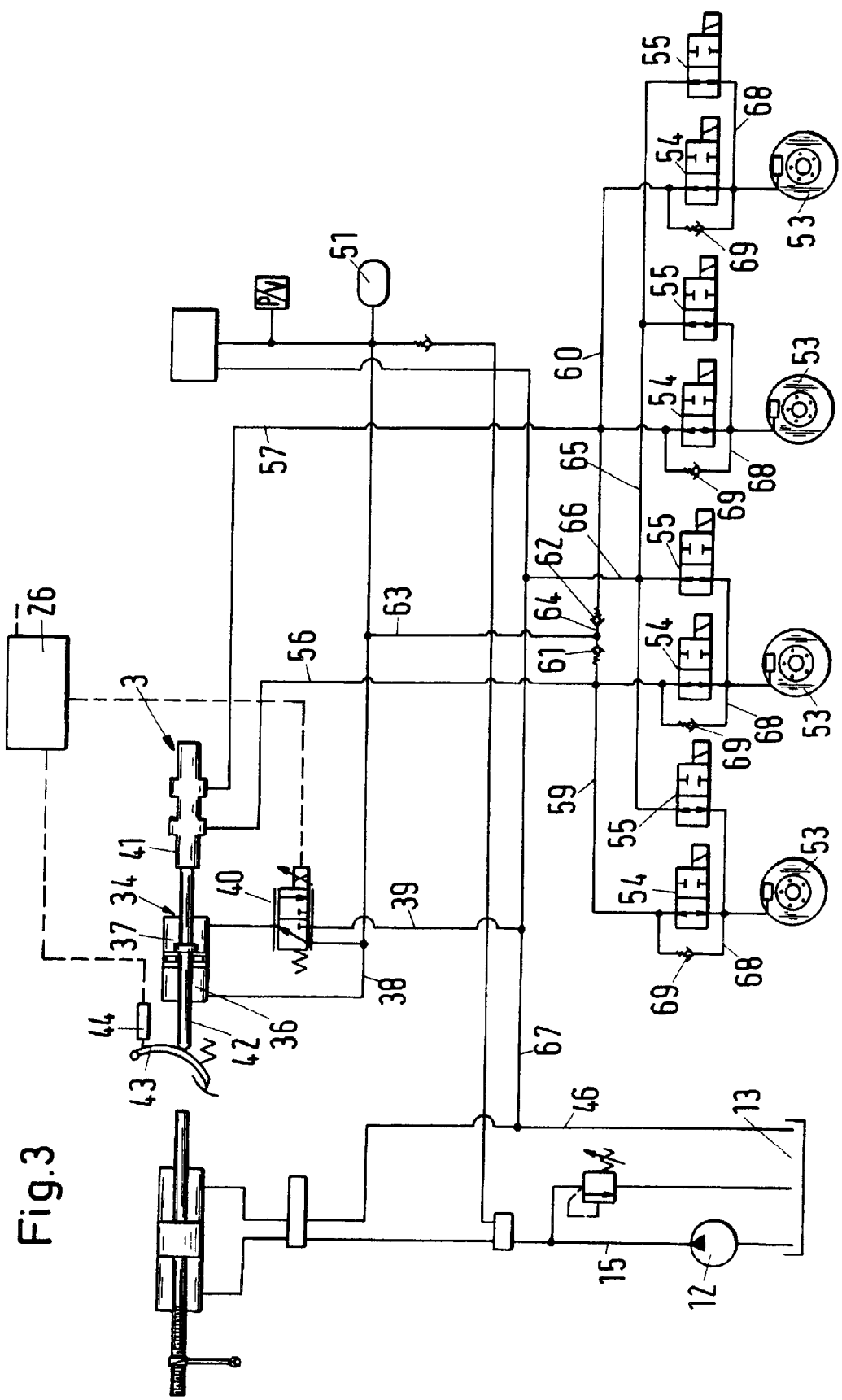
FIG. 3 shows a master circuit diagram of the hydraulic system according to the invention.

FIG. 3 shows the hydraulic system with the brake device 3 having an antilock function (ABS or ALS system). Each vehicle wheel 53 has correlated therewith in a manner known in the art solenoid valves 54, 55 with which the flow of hydraulic medium is controlled. The solenoid valves 54,55 are connected in a manner known in the art via hydraulic lines 56, 57 to the master brake cylinder 41 of the brake device 3. Via this antilock system (ABS or ALS system) the vehicle is braked in a manner known in the art in a reliable fashion independent of the brake pedal movement of the vehicle.

Each solenoid valve 54 has a hydraulic line 59, 60 which is connected to the hydraulic line 56, 57, respectively, of the master brake cylinder 41. The two hydraulic lines 59, 60 are blocked relative to one another by a check valve 61, 62, respectively. The pressure chamber 36 of the brake power assist unit 34 is connected via hydraulic line 38 to the pressure reservoir 51. A hydraulic line 63 branches off the hydraulic line 38 and opens into a hydraulic line 64 in the area between the two check valves 61, 62. When the check valve 61, 62 is open, the hydraulic line 63 is connected with the hydraulic line 59 or 60, respectively.

The solenoid valves 55 are connected to a common hydraulic line 65 which is connected by a hydraulic line 66 with a reservoir line 67. The reservoir line 67 is connected to the reservoir line 46.

Each solenoid valve 55 is connected by a line 68 with the hydraulic line 59, 60, respectively. In the line 68 a check valve 69 is arranged, respectively which blocks in the direction of the solenoid valve 55.

When the brake pedal 43 is actuated, the control unit 26 receives a signal via the sensor 44. It switches the brake valve 40 so that the hydraulic medium from the pressure chamber 37 of the brake power assist unit 34 is relieved via lines 39, 67, 46 to the reservoir 13. By means of the piston rod 42, the master brake cylinder 41 is actuated. The antilock system operates in a manner known in the art in that sensors monitor the circumferential speed of the motor wheels 53. The hydraulic medium flows via lines 56, 57 to the solenoid valves 54 and via the lines 68 to the neighboring solenoid valves 55. From here the medium flows through the neighboring solenoid valves 55. The antilock system operates in a manner known in the art. As soon as one of the vehicle wheels 53 locks during braking, the solenoid valves of the corresponding vehicle wheel 53 are switched such that the braking action is reduced and the vehicle wheel no longer locks. As soon as this vehicle wheel has again reached the prescribed circumferential speed, the corresponding solenoid valves 54, 55 are switched again and the wheel is again braked.

Figure 4:
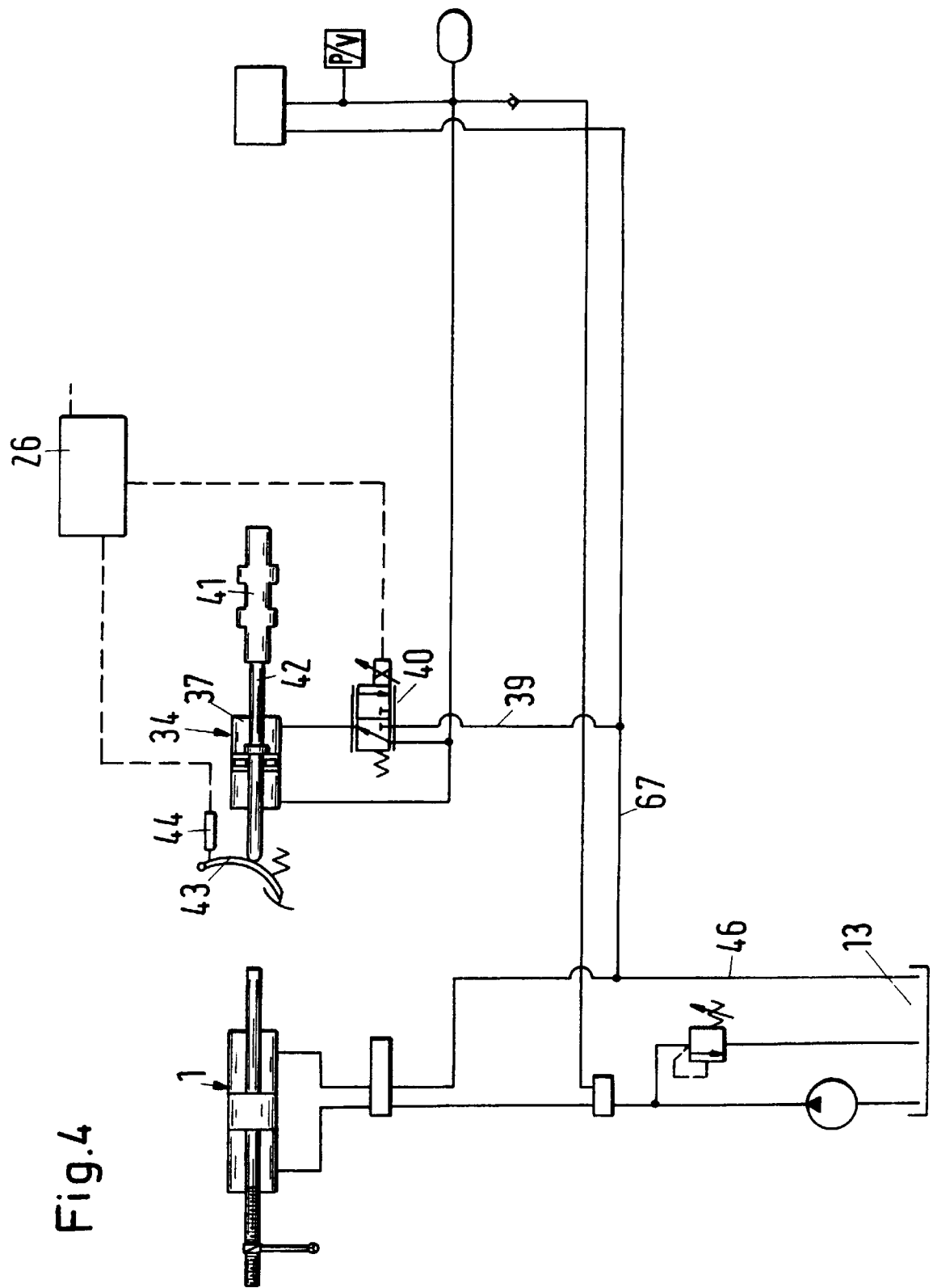
FIG. 4 shows a master circuit diagram of the hydraulic system according to the invention when the brake is inactive (open)

With the aid of FIG. 4, a situation is described where the embodiment according to FIG. 1 experiences system failure. In this case, the brake remains open (inactive) so that the vehicle can be towed without additional expenditure. However, the manual function of the brake via the brake pedal 43 remains intact but without the brake power assist of the brake power assist unit 34 with the master brake cylinder 41. A system failure can occur, for example, when the pressure in the hydraulic system drops and/or the valve current supply fails. When in such a situation the driver of the motor vehicle presses on the brake pedal 43, the sensor 44 is actuated so that via the control unit 26 the brake valve 40 is switched from the position illustrated in FIG. 4. When suppressing the brake pedal 43, the hydraulic medium, which is present within the pressure chamber 37 of the brake power assist unit 34, can be displaced via the brake valve 40 and the lines 39, 67, and 46 to the reservoir 13. By means of the piston rod 42 of the brake power assist unit 34, the master brake cylinder 41 can be actuated for the braking action.

Figure 5:
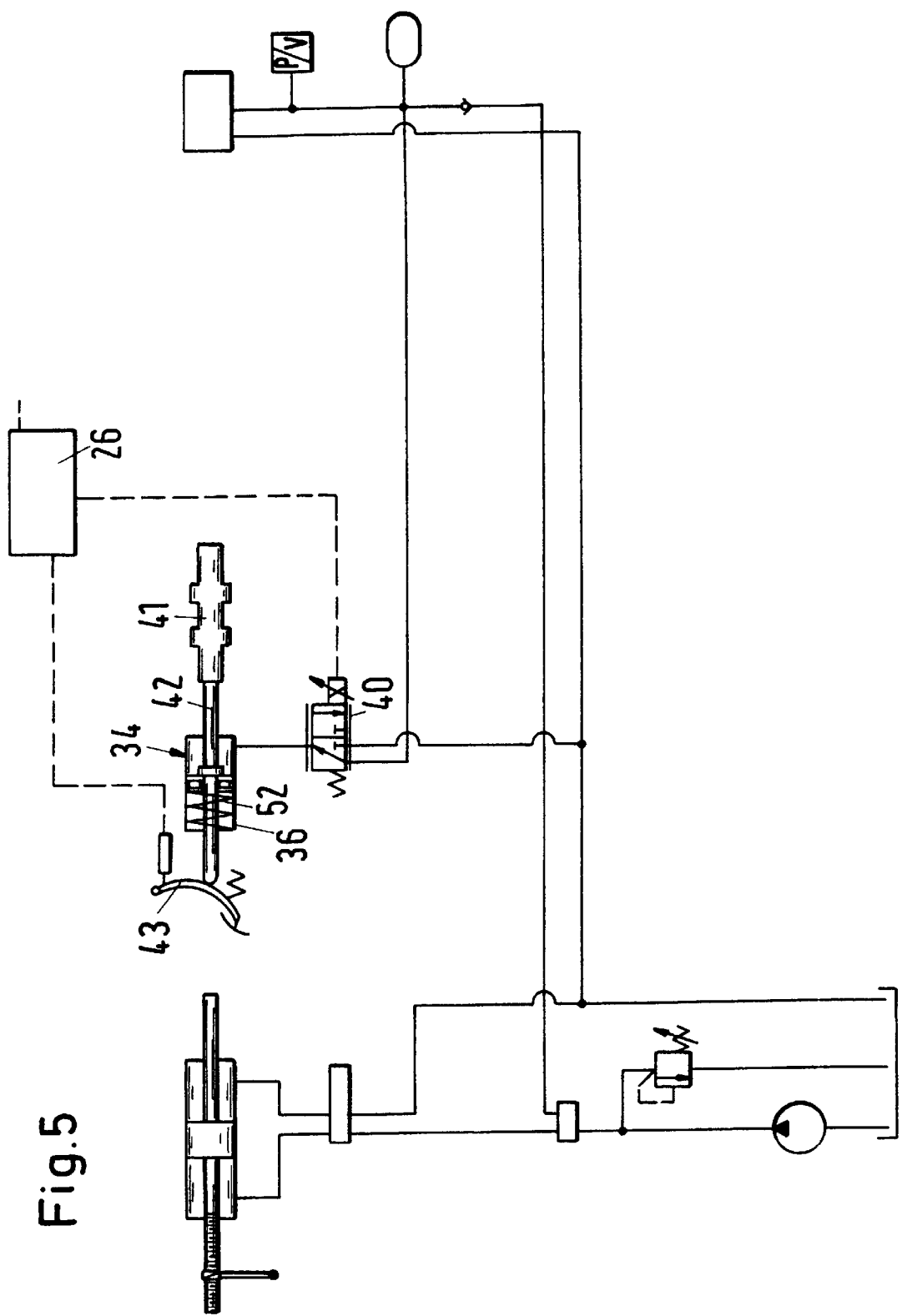
FIG. 5 shows the master circuit diagram of the hydraulic system according to FIG. 4 when the brake is active (closed)

With the aid of FIG. 5, the situation will be explained where for a system failure in the embodiment according to FIG. 2 the brake is closed (active) so that at the brake power assist unit 34 the full brake pressure is present. In the case of system failure, the pressure spring 52 arranged within the pressure chamber 36 of the brake power assist unit 34 ensures that the piston rod 42 is moved and the master brake cylinder 41 is accordingly actuated. In an emergency situation the brake is thus automatically actuated without the driver having to suppress the brake pedal 43. At the brake power assist unit 34 the full brake pressure is present as a result of the force of the spring 52. The vehicle can be braked to a standstill via the described antilock system of FIG. 3. In the control unit 26 different brake programs can be stored, for example, for full braking, for a targeted slow deceleration and the like. It is thus ensured by means of the control unit 26 that the vehicle can be reliably braked even in a system failure situation.

As has been explained with the aid of FIG. 3, the hydraulic system also takes over the anti-lock function of the vehicle. The brake pressure is controlled for each braked vehicle wheel 53 by means of the solenoid valves 54, 55. Accordingly, a conventional anti-lock system with control unit, motor, pump, and the like can be eliminated. Since the brake power assist unit 34 is supplied via the pressure reservoir 51, a fast response and high dynamics are ensured. Also, when the pump 12 of the hydraulic system fails, it is ensured by the reservoir contents of the pressure reservoir 51 that the vehicle can be braked reliably with brake power assist.

Figure 6:
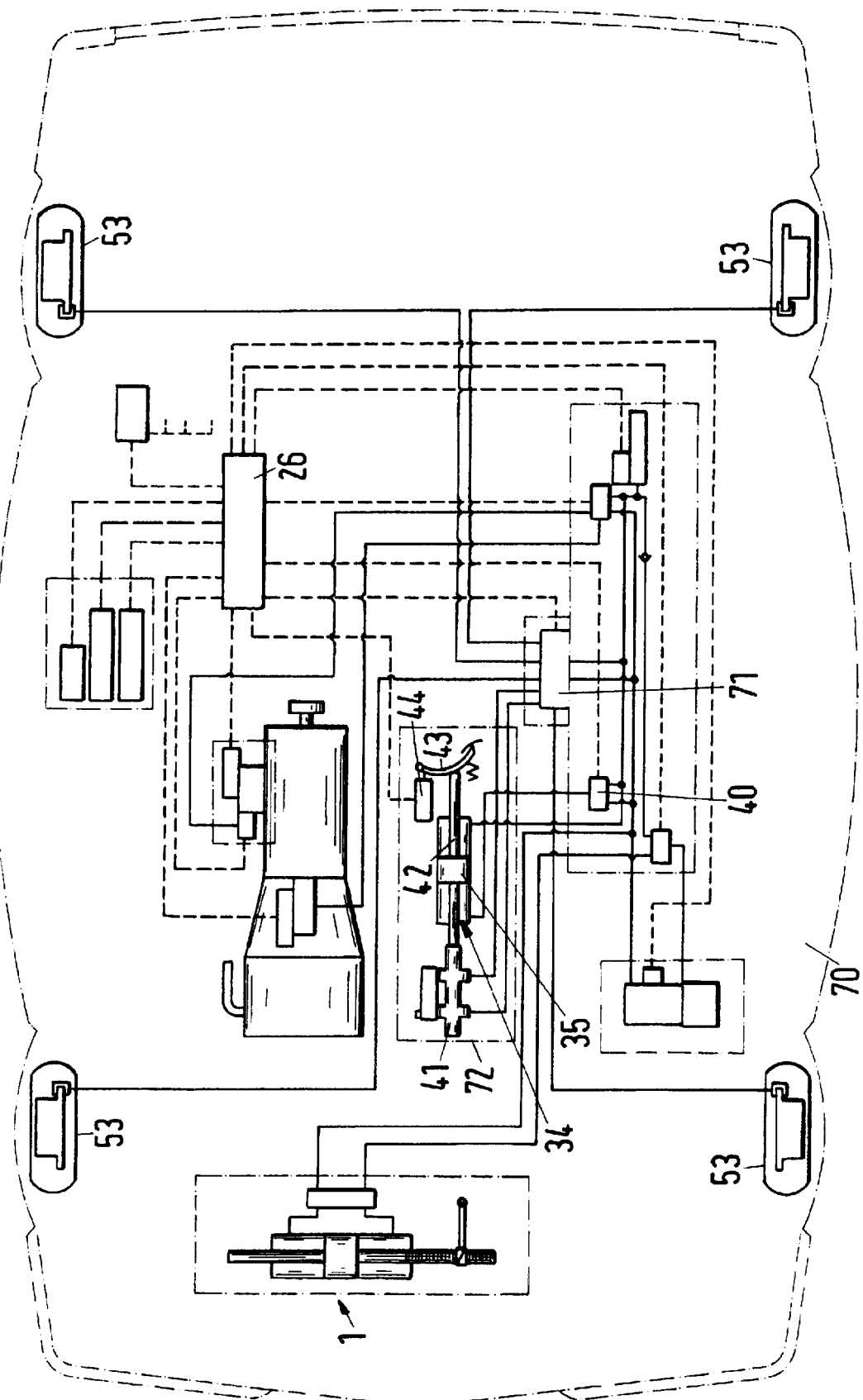
FIG. 6 shows in a schematic illustration the hydraulic system according to the invention arranged in a motor vehicle.

FIG. 6 shows in a schematic illustration the arrangement of the hydraulic system in a motor vehicle 70. The solenoid valves 54, 55 of the antilock system are combined in a valve block 71 which is controlled by the control unit 26. The control unit 26 supplies further signals for an ESP (electronic stability program) system, a ranging device, and the like. Even an emergency brake function when recognizing critical situations is possible. Such critical situations are, for example, a blocked roadway or an obstacle on the roadway. These obstacles are detected by means of a ranging device which sends corresponding signals to the control unit 26. The control unit 26 emits at this point, independent of the movement of the brake pedal 43, signals to the valve block 41 of the anti-lock system which is thus immediately actuated. In this way, the response delay of the driver is compensated and the brake action is started even before the driver actuates the brake pedal 43. The brakes of the motor vehicle 70 can thus be actuated independent of a driver response, which is required, for example, for the active ranging device and the ESP system. The brake assist function is decoupled from the accelerator pedal position. The brake assist function is controlled via the sensor 44 of the brake pedal 43 and the proportional directional valve 40. The directional valve 40 is connected to the control unit 26 so that this valve can be instantly controlled by the control unit 26. The safety concept for the emergency situation is ensured by the still possible manual actuation of the brake device without brake power assist. By actuating the brake pedal 43, the piston 35 is moved within the brake power assist unit 34. By means of the piston rod 42 supporting the piston 35, the master brake cylinder 41 is mechanically actuated without being affected by the pressure conditions within the brake power assist unit.

Since the brake valve 40 is controlled by the control unit 26, the weight of the vehicle 70 can be taken into consideration by means of a program which is stored within the control unit in order to obtain an optimal brake power assist as a function of the vehicle speed and the vehicle mass. The brake power assist unit 34 and the master brake cylinder 41 form a brake assist device 72 which has an extremely short response time of, for example, only 5 ms. In conventional antilock systems underpressure or vacuum is required for the brake power assist function. In diesel or turbo engines a sufficient underpressure is often not present. The described hydraulic system according to the invention makes it possible to employ a conventional antilock system even in the case of such engines.

While specific embodiments of the invention have been shown and described in detail to illustrate the inventive principles, it will be understood that the invention may be embodied otherwise without departing from such principles.

What is claimed is:

1. A hydraulic system for actuating at least two operating systems (1, 2, 3) of a motor vehicle, said hydraulic system comprising:
   a first hydraulic medium reservoir (13) configured to store a hydraulic medium;
   a distribution valve (16) connected to said first hydraulic medium reservoir (13) and to the at least two operating systems (1, 2, 3) of the motor vehicle;
   a control unit (26) connected to said distribution valve (16);
   said distribution valve (16) configured to distribute the hydraulic medium from said first hydraulic medium reservoir (13) to the at least two operating systems (1, 2, 3) of the motor vehicle and to control flow of the hydraulic medium to the at least two operating systems (1, 2, 3) of the motor vehicle such that one of the at least two operating systems (1, 2, 3) has priority with regard to supply of the hydraulic medium;

wherein a first one of said at least two operating systems (1, 2, 3) is a brake device (3), comprising a brake power assist unit (34), a brake valve (40), and a master brake cylinder (41);

wherein said brake power assist unit (34) is connected via said brake valve (40) to said control unit (26);

wherein said brake power assist unit (34) comprises a cylinder and a piston (35) slidingly arranged in said cylinder and separating said cylinder into a first pressure chamber (36) and a second pressure chamber (37), wherein said second pressure chamber (37) is connected to said brake valve (40); and further comprising a second hydraulic medium reservoir (51), wherein said first pressure chamber (36) is connected to said second hydraulic medium reservoir (51).

2. The hydraulic system according to claim 1, wherein a second one of said at least two operating systems (1, 2, 3) is a steering device (1) and a third one of said at least two operating systems (1, 2, 3) is a transmission.

3. The hydraulic system according to claim 1, wherein said brake valve (40) is a proportional directional control valve.

4. The hydraulic system according to claim 1, wherein said piston (35) comprises a piston rod (42) configured to actuate said master brake cylinder (41).

5. The hydraulic system according to claim 1, wherein said second pressure chamber (37) faces said master brake cylinder (41).

6. The hydraulic system according to claim 1, wherein said brake device (3) comprises an antilock system connected to said master brake cylinder (41) and to said second hydraulic medium reservoir (51).

7. The hydraulic system according to claim 1, wherein said brake device (3) comprises a brake pedal sensor (44) connected to said control unit (26).

8. The hydraulic system according to claim 1, wherein said brake device (3) comprises an antilock system connected to said master brake cylinder (41).

9. The hydraulic system according to claim 8, wherein said antilock system comprises valves (54, 55) assigned separately to each wheel of the motor vehicle.

10. The hydraulic system according to claim 8, wherein said control unit (26) comprises a ranging device.

11. The hydraulic system according to claim 10, wherein said antilock system is configured to be actuated by said control unit (26) based on signals emitted by said ranging device.

12. The hydraulic system according to claim 1, wherein said brake power assist unit (34) is configured to be actuated by said control unit (26) independent of an actuation of a brake pedal (43) of said brake device (3).

* * * * *